United States Patent [19]
Nakanishi et al.

[11] Patent Number: 5,475,292
[45] Date of Patent: Dec. 12, 1995

[54] APPARATUS FOR RESTARTING INVERTER FOR DRIVING SYNCHRONOUS MOTOR AFTER MOMENTARY INTERRUPTION

[75] Inventors: Takashi Nakanishi; Shinichi Ishii, both of Kawasaki, Japan

[73] Assignee: Fuji Electric Co., Ltd., Kanagawa, Japan

[21] Appl. No.: 97,210

[22] Filed: Jul. 27, 1993

[30] Foreign Application Priority Data

Jul. 28, 1992 [JP] Japan .................................. 4-222114

[51] Int. Cl.⁶ ........................................................ H02P 1/46
[52] U.S. Cl. ......................... 318/705; 318/706; 363/50; 363/55; 361/71
[58] Field of Search ...................... 318/766, 706, 318/800, 803, 802, 811, 729, 807, 712, 700, 705, 722, 717, 453; 363/37, 74, 50, 51, 96, 92, 54, 88, 64, 34, 55, 95, 97; 361/71, 78, 85, 92; 323/243, 266

[56] References Cited

U.S. PATENT DOCUMENTS

| 3,829,757 | 8/1974 | Frank et al. | |
| 4,093,898 | 6/1978 | Morters et al. | 318/766 |
| 4,328,454 | 5/1982 | Okuyama et al. | 318/803 |
| 4,376,968 | 3/1983 | Wueschinski et al. | 363/37 |
| 4,620,296 | 10/1986 | Siemon | 363/51 |
| 4,672,520 | 6/1987 | Ueda et al. | 363/54 |
| 4,758,771 | 7/1988 | Saito et al. | 318/729 |
| 4,876,637 | 10/1989 | Mose et al. | 363/37 |
| 5,113,125 | 5/1992 | Stacey | 318/721 |
| 5,206,575 | 4/1993 | Nakamura et al. | 318/807 |

FOREIGN PATENT DOCUMENTS 3523626   1/1986   Germany.

OTHER PUBLICATIONS

Energie & Automation Produktinformation 9, 1989, H.1, S.8–11, "Für Drehstrom-antriebe bis 45 kVA: Simovert-P-Umrichter 6SE46/6SE11", Hentschel, et al.

Primary Examiner—John W. Cabeca
Attorney, Agent, or Firm—Spencer, Frank & Schneider

[57] ABSTRACT

An apparatus for restarting an inverter after momentary interruption by detecting a power restoration after a momentary outage of a power supply that supplies power to the inverter for driving a synchronous motor. The apparatus includes a frequency detecting portion that detects the frequency of a terminal voltage of the synchronous motor, a phase difference detector that detects the phase difference between the terminal voltage of the synchronous motor and the output voltage command value of the inverter, a phase controller that performs synchronous control so that the frequency and phase of the output voltage command value of the inverter and those of the terminal voltage of the synchronous motor agree with each other, and a restarting portion that restarts the inverter under the condition that the synchronization has been completed after the power restoration of the power supply. This makes it possible to reduce the restarting time after a momentary interruption of the power supply, and to reduce the rush current at the restarting, and the capacity of the inverter.

5 Claims, 6 Drawing Sheets

APPARATUS FOR RESTARTING INVERTER FOR DRIVING SYNCHRONOUS MOTOR AFTER MOMENTARY INTERRUPTION

BACKGROUND OF THE INVENTION

1. Field of the Invention

The present invention relates to an apparatus for restarting an inverter for driving a synchronous motor after momentary interruption, and particularly to an apparatus which restarts inverters when a power supply is restored after a momentary power outage in spinning lines or the like, wherein synchronous motors are operated in groups by the inverters.

2. Description of Related Art

A conventional restart method applied to recovery after a momentary interruption usually stops the output of an inverter when the power supplied to the inverter is lost, and then recovers the output when the power is subsequently restored. To begin the restart operation when the power is restored, the output frequency of the inverter is set at the same frequency as that when the inverter is stopped, and only the output voltage is gradually increased.

In the conventional method, the output voltages of the inverter at the restart will be out of phase with the voltages at the motor terminals because the restart timing is set at random.

As a result, the rush current at the restart may become large. This crests a problem in that the capacity and installation area of the inverter become large, and its cost increases.

In addition, when the speed change in the motor is great owing to a heavy load, tedious steps as follows must be taken in restoring the inverter. First, the output frequency of the inverter is gradually reduced by a current limiting operation after the restart until the speed of the motor matches the output frequency, and then, the motor is reaccelerated to the original speed.

This poses another problem in that the restart time is prolonged because it takes a lot of time for the motor to restore its original speed.

SUMMARY OF THE INVENTION

It is therefore an object of the present invention to provide an apparatus for restarting an inverter for driving a synchronous motor after momentary interruption, which can prevent the inverter from increasing its capacity by reducing the rush current at the restart, and in addition, shorten the restart time.

The present invention provides an apparatus for restarting an inverter for driving a synchronous motor after momentary interruption, the apparatus restarting an inverter when power supplied to the inverter by a power supply is restored after an interruption, the apparatus comprising:

detecting means for detecting a correlate of a terminal voltage of the synchronous motor;

frequency detecting means for detecting frequency of the terminal voltage of the synchronous motor;

phase difference detecting means for detecting phase difference between the terminal voltage of the synchronous motor and an output voltage command value of the inverter;

means for detecting an interruption of the power supply;

means for performing, during the interruption of the power supply, synchronous control on the basis of output signals of the frequency detecting means and the phase difference detecting means so that the frequency and phase of the output voltage command value of the inverter and the frequency and phase of the terminal voltage of the synchronous motor agree with each other; and means for restarting the inverter under the condition that the synchronization of the synchronous control has been completed after the interruption.

Here, the detecting means may comprise a detector that detects a flux of the synchronous motor as the correlate of the terminal voltage of the synchronous motor, and the frequency detecting means may comprise a period detector that detects a period of the terminal voltage on the basis of the output of the detector detecting a flux, and a frequency calculator that calculates from the period of the terminal voltage the frequency of the terminal voltage.

The detecting means may comprise a detector that detects a flux of the synchronous motor as the correlate of the terminal voltage of the synchronous motor, and the phase difference detecting means may comprise a phase difference detector that detects phase difference between the terminal voltage of the synchronous motor and an output voltage command value of the inverter on the basis of the flux detection value and a flux command value of the synchronous motor, and a phase controller that performs the synchronous control on the basis of an output signal of the phase difference detector.

The period detector may comprise a comparator that compares the flux detection value with zero, and a counter that counts the width of the output of the comparator.

The phase difference detector may comprise a phase difference pulse generator that generates a pulse whose width is proportional to the phase difference between the flux detection value of the synchronous motor and the flux command value of the inverter, and a counter that counts the width of the phase difference pulse.

According to the present invention, during a momentary interruption, the output voltage of the inverter is controlled on the basis of the output of the frequency detecting means and the phase difference detecting means, so that its frequency and phase match those of the terminal voltage of the synchronous motor in a free-running condition. After the power restoration, the output of the inverter is recovered under the condition that the synchronization has been completed.

As a result, speed variation of the synchronous motor at the restart is reduced. This makes it possible to eliminate the problem that it takes a long time to stabilize the speed, thereby shortening the restart time.

In addition, since the output of the inverter is accepted only after its frequency and phase agree with those of the synchronous motor by the synchronous control, the rush current at the restart can be reduced. This makes it possible to prevent the capacity of an inverter from increasing, thereby reducing its cost and installation area.

The above and other objects, effects, features and advantages of the present invention will become more apparent from the following description of the embodiment thereof taken in conjunction with the accompanying drawings.

DETAILED DESCRIPTION OF PREFERRED EMBODIMENT

The invention will now be described with reference to the accompanying drawings.

Figure 1:
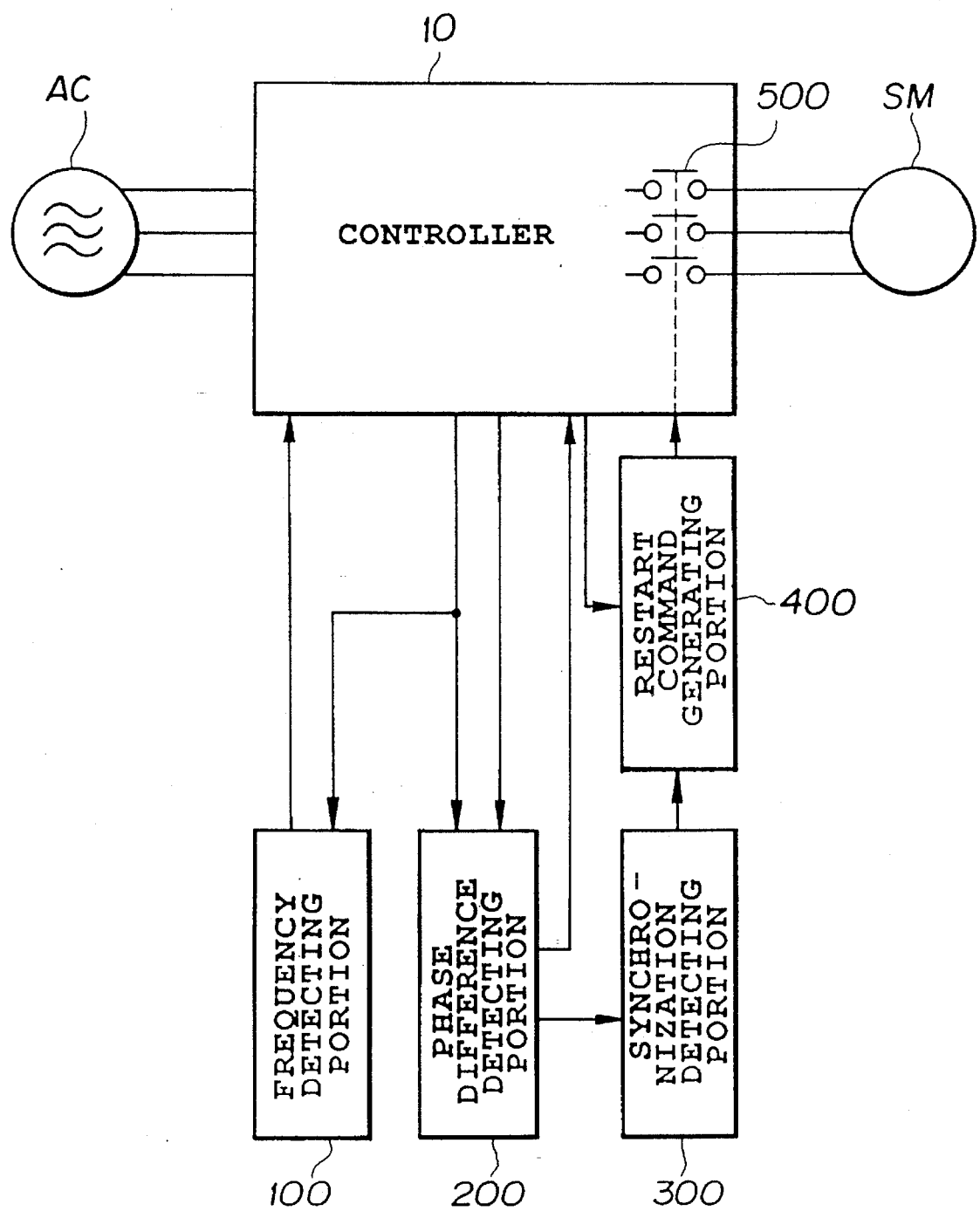
FIG. 1 is a block diagram showing an embodiment of an apparatus for restarting an inverter for driving a synchronous motor after momentary interruption in accordance with the present invention.

FIG. 1 is a schematic block diagram showing an embodiment in accordance with the present invention. In this figure, controller 10, which is supplied with power by an AC power supply AC, drives a synchronous motor SM.

The frequency of a terminal voltage of the synchronous motor SM is detected by a frequency detecting portion 100, and the detected frequency is applied to controller 10. The phase difference between the terminal voltage of the synchronous motor SM and the output voltage command value of controller 10 is detected by a phase difference detecting portion 200. The phase difference detecting portion 200 generates a phase control signal based on the detected signal, and supplies the phase control signal the to controller 10. At the same time, the phase difference signal produced by the phase difference detecting portion 200 is inputted to a synchronization detecting portion 300 which detects a synchronous state between the synchronous motor SM and controller 10 on the basis of the phase difference signal. The output of the synchronization detecting portion 300 and a power detecting signal (a detecting signal of a power outage or a power restoration) produced from controller 10 are inputted to a restart command generating portion 400 which turns on and off a switch 500 in the controller 10 to start or stop supplying power to the synchronous motor SM.

Figure 2:
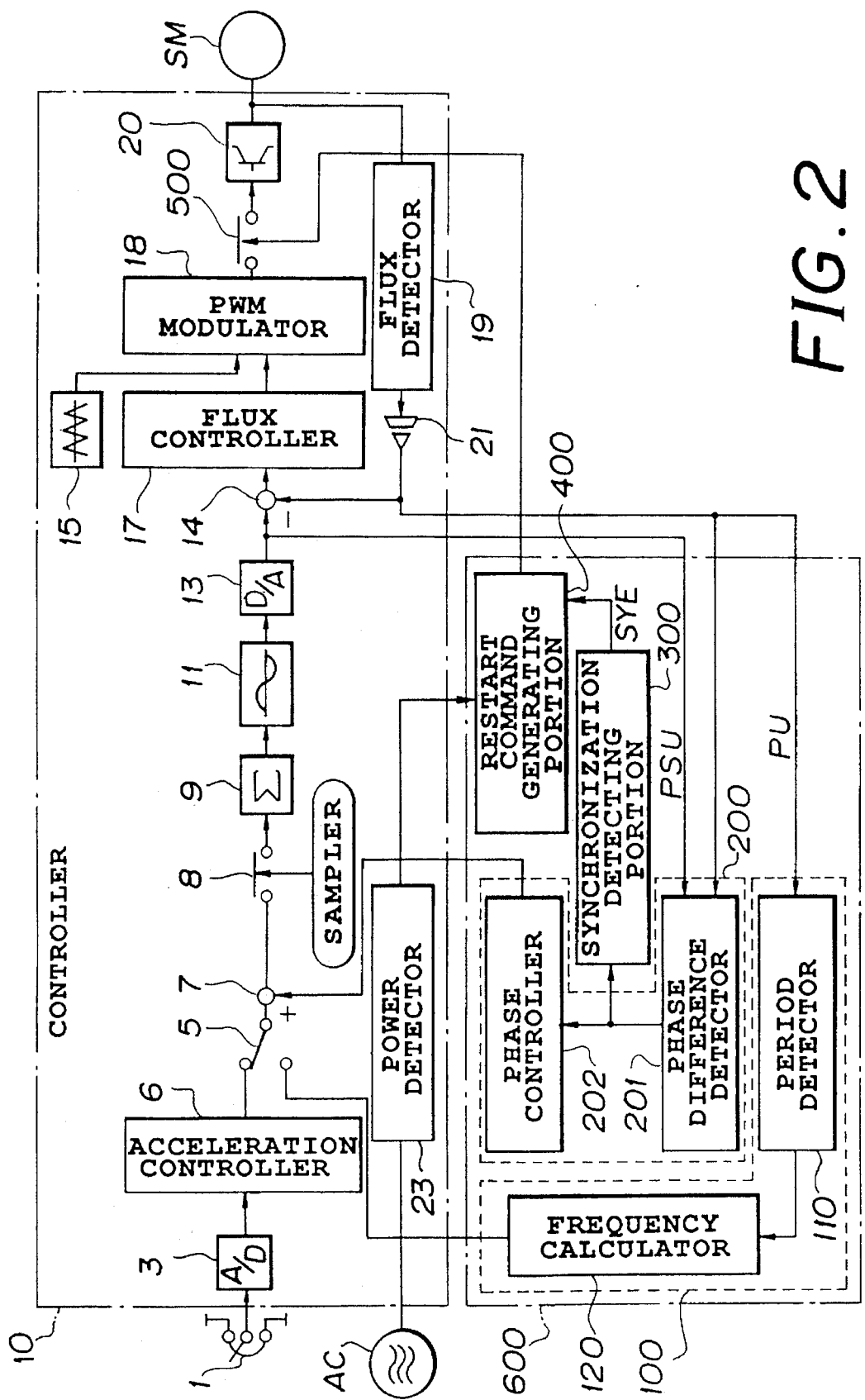
FIG. 2 is a block diagram showing a more detailed arrangement of the embodiment as shown in FIG. 1.

FIG. 2 shows a major portion of FIG. 1.

Controller 10 comprises an acceleration controller 6 which is connected to an output frequency setter 1 via an A/D converter 3. The output signal of the controller 6 is applied to an output frequency transfer switch 5 that switches between the output signal of the controller 6 and that of a frequency calculator 120. The output of the switch 5 is added to the output of a phase controller 202 (which will be described later) by an adder 7 so that phase correction is carried out. The output of the adder 7 is sampled by a sampler 8 that turns on and off a switch thereof at a fixed interval. The output of the sampler 8 is supplied to an integrator 9 that converts the frequency data (the output of the sampler 8) into angle data. The angle data is converted into a sine signal by a sine wave generator 11. The generated sine wave of a digital form is converted into an analog signal by a D/A converter 13. This analog sine wave signal is a flux command value of controller 10. The flux command value outputted from the D/A converter 13 is fed to an adder 14 that subtracts a detected flux value from the flux command value, and the result of the subtraction is applied to a flux controller 17. The output of the flux controller 17 and that of a carrier-wave generator 15 are supplied to a PWM modulator 18 that generates a PWM signal. The PWM signal is supplied to an inverter 20 via a switch 500 in order to control the switching operation of the switching devices 20. The output of inverter 20 is fed to the synchronous motor SM, and a terminal of the synchronous motor SM is connected to a flux detector 19. The output of the flux detector 19 is inputted to an isolating amplifier 21 that outputs a flux detection value PU. A power outage of the AC power supply AC is detected by a power detector 23. These elements constitute controller 10.

The reference numeral 600 designates a frequency and phase detecting unit comprising the frequency detecting portion 100, the phase difference detecting portion 200, the synchronization detecting portion 300, and the restart command generating portion 400.

The frequency detecting portion 100 comprises a period detector 110 and a frequency calculator 120. The period detector 110 detects the period of a terminal voltage of the synchronous motor SM on the basis of the flux detection value PU. The output of the period detector 110 is inputted to the frequency calculator 120 that calculates the frequency of the terminal voltage on the basis of the period.

The phase difference detecting portion 200 comprises a phase difference detector 201 and the phase controller 202. The phase difference detector 201 detects the phase difference between the terminal voltage of the synchronous motor SM and the output voltage command value of the controller 10 on the basis of the flux detection value PU and a flux command value PSU. The phase controller 202 outputs a phase control signal which is inputted to the adder 7 of controller 10.

The output signal of the phase difference detector 201 is inputted to the synchronization detecting portion 300 which provides the restart command generating portion 400 with a synchronization completion signal SYE.

The output signal of the power detector 23 is also inputted to the restart command generating portion 400, which generates an ON/OFF signal supplied to the switch 500 in controller 10.

Next, the operation of the embodiment will be described with reference to the timing chart of FIG. 3.

Figure 3:
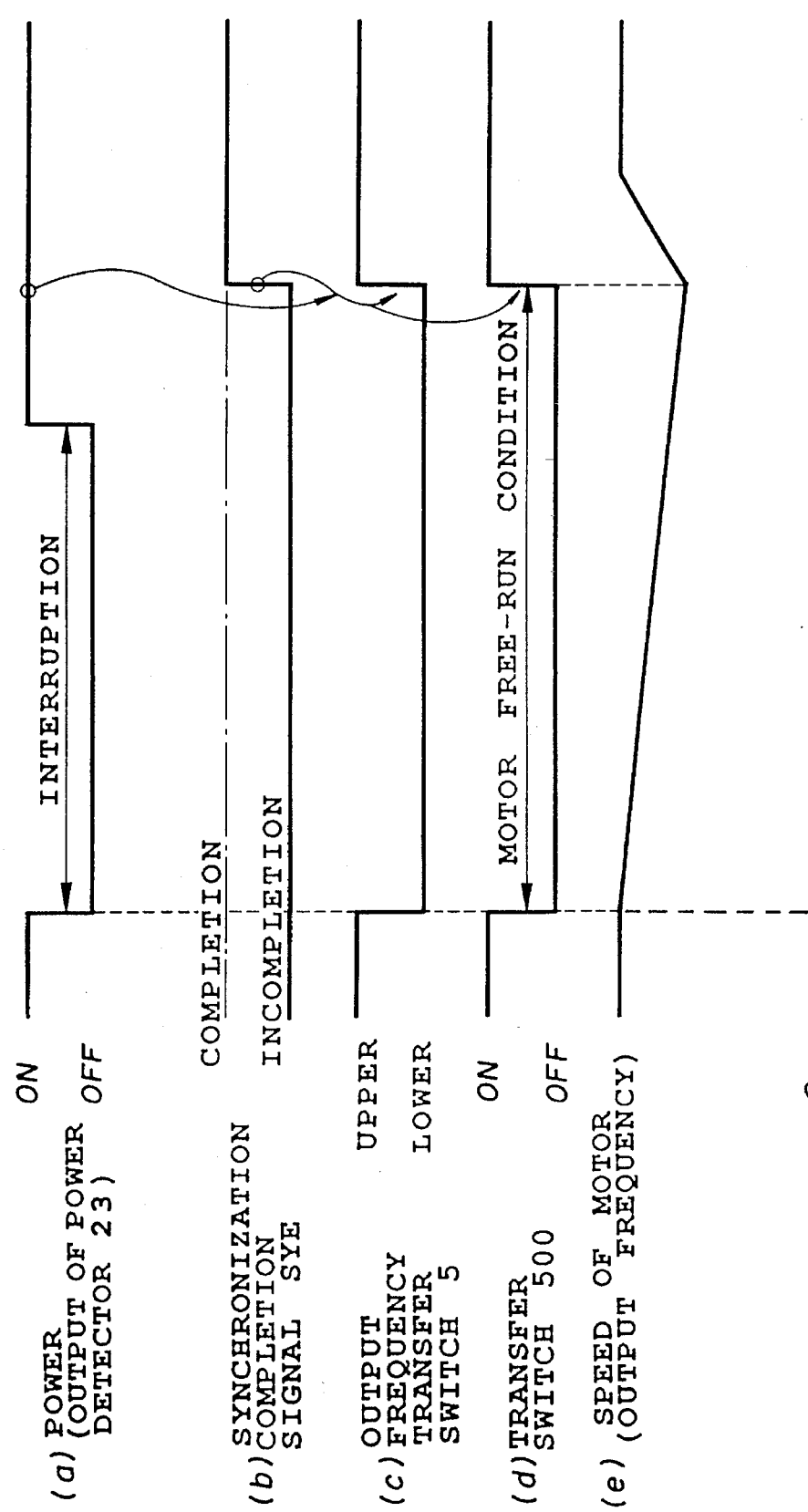
FIG. 3 is a timing chart illustrating the operation of the embodiment as shown in FIGS. 1 and 2.

First, if a power outage of the AC power supply AC occurs, the power detector 23 detects it, and outputs the OFF signal as shown at (a) of FIG. 3. This signal will turn off the switch 500 via the restart command generating portion 400 as shown at (d) of FIG. 3. Hence, the switching operation of inverter 20 is stopped, and the synchronous motor SM enters into a free-run condition as shown at (d) of FIG. 3, and its speed gradually drops as shown at (e) of FIG. 3. The frequency and phase of the terminal voltage of the synchronous motor SM are detected by the frequency and phase detecting unit 600.

Controller 10, on the other hand, switches the output frequency transfer switch 5 to the frequency and phase detecting unit 600 (that is, to the lower contact in FIG. 2) as shown at (c) of FIG. 3, so that the output frequency of controller 10 is determined by the output signal of the frequency calculator 120. Thus, the controller 10 enters into a synchronous control state using the output signal of the phase controller 202.

Subsequently, when the restoration of the AC power supply AC is detected by the power detector 23 as shown at (a) of FIG. 3, and the synchronous state is detected by the synchronization detecting portion 300 on the basis of the output signal of the phase difference detector 201 as shown at (b) of FIG. 3, the restart con, hand generating portion 400 outputs a restart command to turn on the switch 500. This will restart the switching operation of inverter 20 at a frequency and phase corresponding to the speed of the synchronous motor SM.

At the same time, the output frequency transfer switch 5 is switched back to the acceleration controller 6 (that is, to the upper contact in FIG. 2) as shown at (c) of FIG. 3, and the output frequency of controller 10 and the speed of the synchronous motor SM are increased so that the output frequency becomes equal to the frequency set by the output frequency setter 1. In due course, the output frequency of controller 10 is stabilized at the set frequency.

In this way, the frequency and phase of the output voltage command value of controller 10 undergo the synchronous control so that they coincide with those of the terminal voltage of the synchronous motor SM at the restart of the inverter. As a result, the rush current at the restart can be reduced, and the time required for the restart can be shortened.

Next, the F. period detector 110 and the phase difference detector 201 will be described in more detail with reference to FIGS. 4 and 5.

Figure 4:
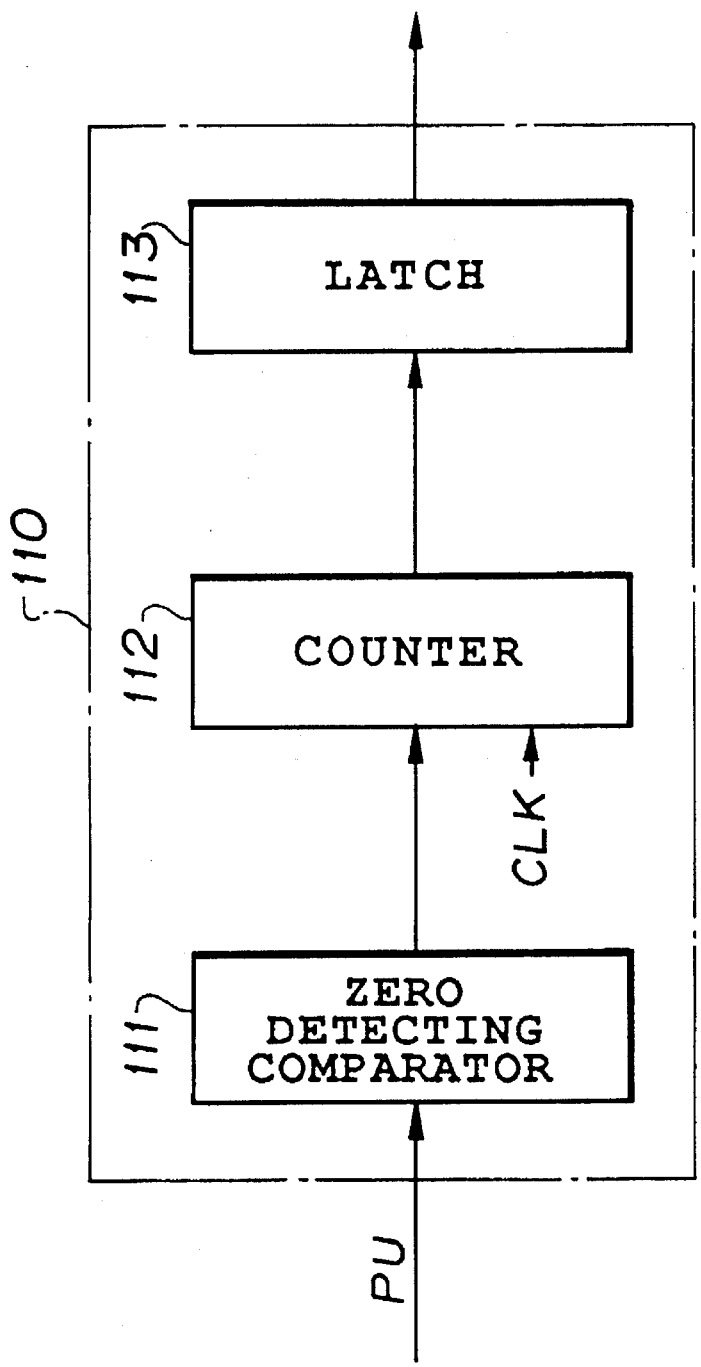
FIG. 4 is a block diagram showing the period detector in FIG. 2.

In FIG. 4, the period detector 110 comprises a zero detecting comparator 111, a counter 112, and a latch 113. The zero detecting comparator 111 outputs the "H" level when the flux detection value PU is greater than zero. The counter 112, receiving the output of the comparator 111 and an original clock CLK, counts the width of the output of the comparator 111. The latch 113 latches the output of the counter 112, which corresponds to the period of the terminal voltage of the synchronous motor SM.

Figure 5:
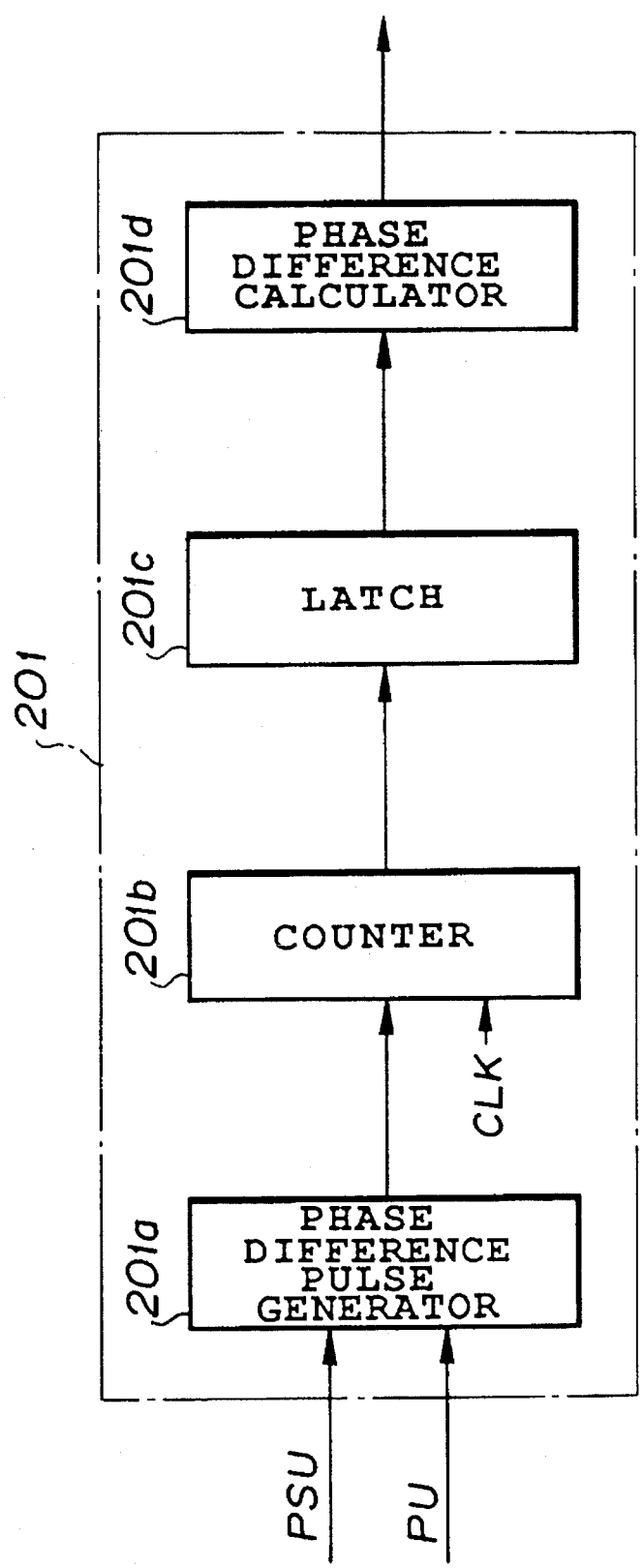
FIG. 5 is a block diagram showing the phase difference detector of FIG. 2.

In FIG. 5, the phase difference detector 201 comprises a phase difference pulse generator 201a, a counter 201b, a latch 201c, and a phase difference calculator 201d. The phase difference pulse generator 201a detects the phase difference between the flux detect on value PU and the flux command value PSU, and outputs phase difference pulses whose width is proportional to the phase difference. The counter 201b counts the width of the individual phase difference pulses using the original clock CLK. The latch 201c latches the output of the counter 201b, which corresponds to the phase difference. The phase difference calculator 201d accepts the output of the latch 201c, and calculates the phase difference.

The operation of the period detector 110 and the phase difference detector 201 will be described with reference to FIG. 6.

Figure 6:
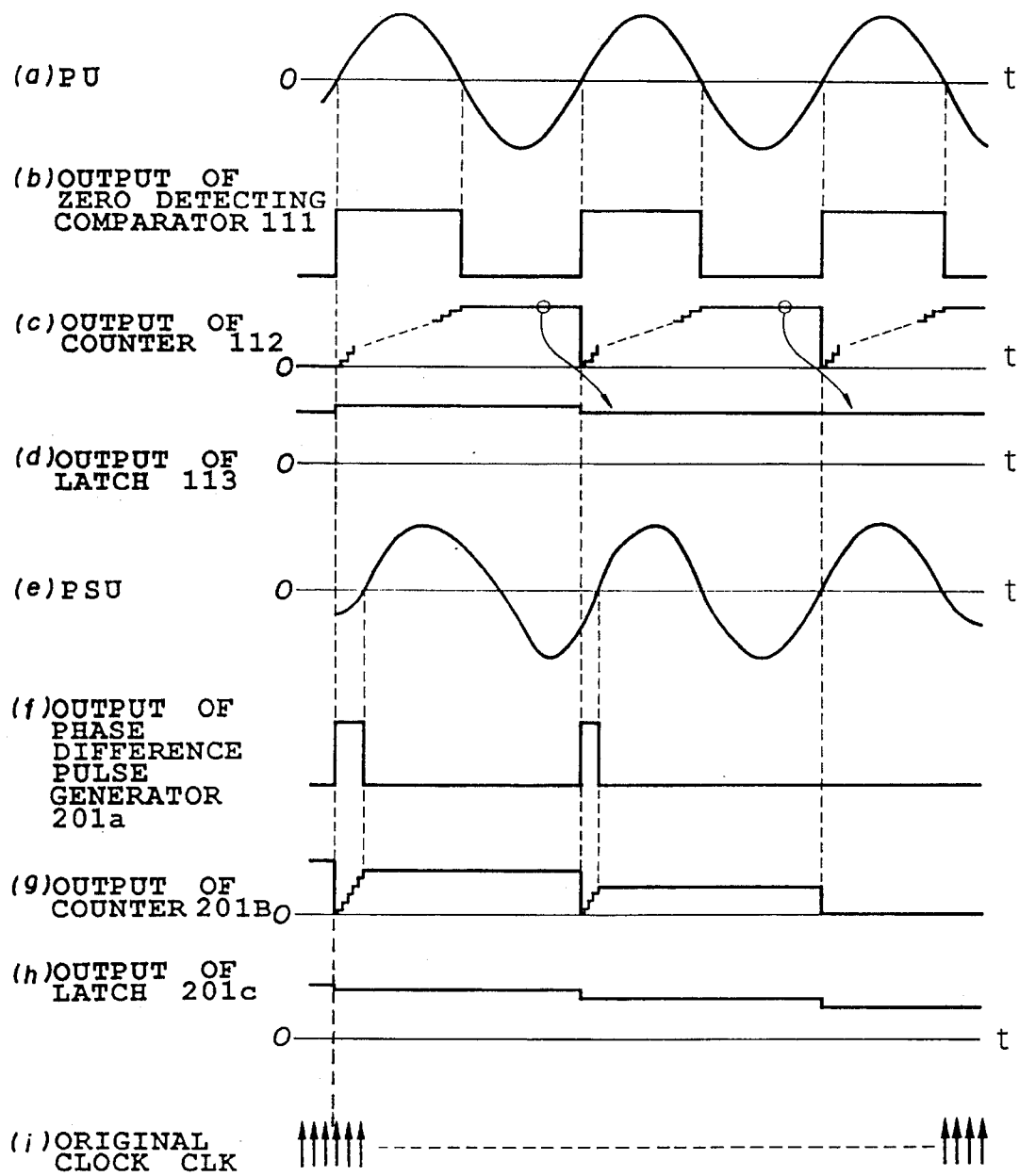
FIG. 6 is a diagram illustrating waveforms for explaining the operation of the period detector and the phase difference detector.

First, the zero detecting comparator 111 of the period detector 110, receiving the flux detection value PU as shown at (a) of FIG. 6, outputs the "H" level signal only when the flux detection value is greater than 0 V as shown at (b) of FIG. 6. The duration of the output signal is counted by the counter 112 using the original clock signal CLK as shown at (c) of FIG. 6, and the counted value is latched by the latch 113 as shown at (d) of FIG. 6. The latched counted value, which corresponds to the period of the terminal voltage of the synchronous motor SM, is delivered to the frequency calculator 120 that converts it to the frequency of the terminal voltage.

The phase difference pulse generator 201a of the phase difference detector 201, receiving the flux detection value PU and the flux command value PSU as shown at (e) of FIG. 6, produces the phase difference pulses as shown at (f) of FIG. 6. Each of the pulses has a width corresponding to the phase difference between PU and PSU. The duration of each pulse is counted by the counter 201b using the original clock CLK as shown at (g) of FIG. 6, and the counted value is latched by the latch 201c as shown at (h) of FIG. 6. The latched counted value is converted to a phase difference by the phase difference calculator 201d.

If the flux detection value PU and the flux command value PSU are synchronized as shown at (a) and (e) of FIG. 6, the width of the phase difference pulse becomes zero as shown at (f) of FIG. 6. At this point, the synchronization detecting portion 300 detects the completion of the synchronization, and outputs the synchronization completion detecting signal SYE.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An apparatus for restarting an inverter for driving a synchronous motor after momentary interruption, said apparatus restarting the inverter when power supplied to the inverter by a power supply is restored after an interruption, said apparatus comprising:

detecting means for detecting a flux of the synchronous motor as a correlate of a terminal voltage of the synchronous motor and producing a corresponding flux detection value;

frequency detecting means for detecting frequency of the terminal voltage of the synchronous motor, said frequency detecting means comprising a period detector that detects a period of the terminal voltage on the basis of the flux detection value, and a frequency calculator that calculates from the period of the terminal voltage the frequency of the terminal voltage;

phase difference detecting means for detecting phase difference between the terminal voltage of the synchronous motor and an output voltage command value;

means for detecting an interruption of the power supply;

means for performing, during the interruption of the power supply, synchronous control on the basis of output signals of the frequency detecting means and the phase difference detecting means so that the frequency and phase of the output voltage command value and the frequency and phase of the terminal voltage of the synchronous motor agree with each other; and means for restarting the inverter under the condition that the synchronization of the synchronous control has been completed after the interruption.

2. The apparatus as claimed in claim 1, wherein said phase difference detecting means comprises a phase difference detector that detects phase difference between the terminal voltage of the synchronous motor and an output voltage command value of the inverter on the basis of the flux detection value and a flux command value of the synchronous motor, and a phase controller that performs the synchronous control on the basis of an output signal of the phase difference detector.

3. The apparatus as claimed in claim 1, wherein said period detector comprises a comparator that compares the flux detection value with zero, and a counter that counts the width of the output pulse of the comparator.

4. An apparatus for restarting an inverter for driving a synchronous motor after momentary interruption, said apparatus restarting the inverter when power supplied to the inverter by a power supply is restored after an interruption, said apparatus comprising:

detecting means for detecting a flux of the synchronous motor as a correlate of a terminal voltage of the synchronous motor and producing a corresponding flux detection value;

frequency detecting means for detecting a frequency of the terminal voltage of the synchronous motor;

phase difference detecting means comprising a phase difference detector and a phase controller, said phase difference detector for detecting a phase difference between the terminal voltage of the synchronous motor and an output voltage command value on the basis of the flux detection value and a flux command value of the synchronous motor, said phase controller outputting a phase control signal on the basis of an output signal of the phase difference detector means for detecting an interruption of the power supply;

means for performing, during the interruption of the power supply, synchronous control on the basis of output signals of the frequency detecting means and the phase difference detecting means so that the frequency and phase of the output voltage command value and the frequency and phase of the terminal voltage of the synchronous motor agree with each other; and means for restarting the inverter under the condition that synchronization of the synchronous control has been completed after the interruption.

5. The apparatus as claimed in claim 4, wherein said phase difference detector comprises a phase difference pulse generator that generates a pulse whose width is proportional to the phase difference between the flux detection value of the synchronous motor and the flux command value of the inverter, and a counter that counts the width of the phase difference pulse.

* * * * *